(12) United States Patent
Godiveau

(10) Patent No.: US 9,505,347 B2
(45) Date of Patent: Nov. 29, 2016

(54) ELECTRICAL POWER SUPPLY SYSTEM FOR AN ELECTRICAL UNIT OF A MOTOR VEHICLE

(71) Applicant: Valeo Vision, Bobigny (FR)

(72) Inventor: Marc Godiveau, Saint-Laurent-du-Var (FR)

( * ) Notice: Subject to any disclaimer, the term of this patent is extended or adjusted under 35 U.S.C. 154(b) by 0 days.

(21) Appl. No.: 14/772,556

(22) PCT Filed: Mar. 5, 2014

(86) PCT No.: PCT/EP2014/054245
§ 371 (c)(1),
(2) Date: Sep. 3, 2015

(87) PCT Pub. No.: WO2014/135580
PCT Pub. Date: Sep. 12, 2014

(65) Prior Publication Data
US 2016/0016514 A1    Jan. 21, 2016

(30) Foreign Application Priority Data

Mar. 8, 2013  (FR) .................................... 13 52084

(51) Int. Cl.
*H05B 33/08* (2006.01)
*B60Q 3/02* (2006.01)
*B60Q 11/00* (2006.01)
*B60Q 1/00* (2006.01)

(52) U.S. Cl.
CPC ........... *B60Q 11/005* (2013.01); *B60Q 1/0094* (2013.01); *B60Q 3/0293* (2013.01); *H05B 33/0815* (2013.01); *H05B 33/0887* (2013.01)

(58) Field of Classification Search
CPC .......... H05B 33/0815; H05B 33/0887; B60Q 11/005; B60Q 1/0094; B60Q 3/0293
See application file for complete search history.

(56) References Cited

U.S. PATENT DOCUMENTS

| | | | |
|---|---|---|---|
| 6,574,081 | B1 | 6/2003 | Matsumoto et al. |
| 8,138,685 | B2 | 3/2012 | Yu et al. |
| 8,779,676 | B2 | 7/2014 | Simi |
| 2010/0315017 | A1 | 12/2010 | Yu et al. |
| 2013/0009547 | A1 | 1/2013 | Shiu et al. |
| 2013/0049589 | A1 | 2/2013 | Simi |

FOREIGN PATENT DOCUMENTS

FR            2957469 A1    9/2011

*Primary Examiner* — Jany Richardson
(74) *Attorney, Agent, or Firm* — Jacox, Meckstroth & Jenkins

(57) ABSTRACT

An electrical supply system for at least one electrical unit of a vehicle, in particular for a lighting unit of a vehicle, the system comprising:
  at least one converter capable of transmitting a basic electrical supply propagating on a basic supply line to the electrical unit as a function of a supply command, the converter being capable of receiving an operational supply via an operational supply line;
  a command module capable of sending the supply command to the converter; and
  at least one interrupt module controlled by the command module, the interrupt module having a state interrupting the operation of the command module when it receives a command to interrupt the command module;
  wherein the interrupt module is capable of maintaining its state when the operation of the command module is interrupted.

18 Claims, 1 Drawing Sheet

ELECTRICAL POWER SUPPLY SYSTEM FOR AN ELECTRICAL UNIT OF A MOTOR VEHICLE

CROSS-REFERENCE TO RELATED APPLICATIONS

Figure 2:
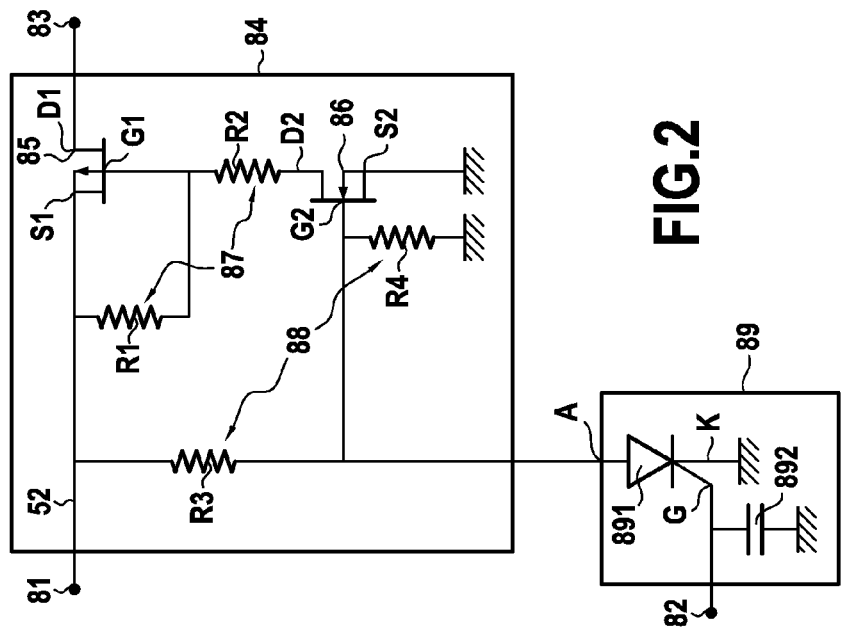

This application is the U.S. National Phase application of PCT Application No. PCT/EP2014/054245 filed Mar. 5, 2014, which claims priority to the French application 1352084 filed on Mar. 8, 2013, which applications are incorporated herein by reference and made a part hereof.

BACKGROUND OF THE INVENTION

1. Field of the Invention

The technical sector of the present invention is that of devices for illuminating the road and/or for signaling and/or for illuminating the interior of the passenger compartment of a motor vehicle.

2. Description of the Related Art

In the field of automobiles, it is known to install in a vehicle a central diagnostic tool capable of diagnosing a malfunction of one or more electrical units of the vehicle in order to manage the electrical system of the vehicle. This tool is, for example, capable of detecting a drop in intensity on the electrical supply line of an electrical unit.

Furthermore, it is also known to use a command module in order to control one or more electrical units of the vehicle. In general, this command module is in particular capable of turning off the electrical supply of an electrical unit which it controls when it observes a malfunction of this unit. This turning off thus forces a drop in current on the electrical supply line so as to inform the central diagnostic tool of the malfunction.

However, in the case in which the command module controls a plurality of electrical units, it is possible to find a current line connected to the supply line of one of these units which passes through the command module in order to arrive at another of these units, or which arrives at the command module itself.

Thus, when the command module observes a malfunction of one of the electrical units, despite the supply of this unit being turned off, a residual current remains flowing on the aforementioned current line to the other unit, or to the command module itself. In this case, the central diagnostic tool is incapable of diagnosing the malfunction of the electrical unit and therefore of managing the system correctly.

One solution for overcoming this problem is to open this current line when a malfunction is observed.

However, this solution has the drawback in certain cases of interrupting the supply of the command module when it is flowing on this current line. This interruption causes closure of the current line, which will thus again supply the command module, the latter again detecting the malfunction and consequently opening the current line again. The system will thus enter an infinite loop of opening and closing the current line, which interferes considerably with its electrical management.

SUMMARY OF THE INVENTION

The object of the invention is, in particular, to overcome this drawback.

The invention therefore relates to an electrical supply system for at least one electrical unit of a vehicle, in particular for a lighting unit of a vehicle, the system comprising:
- at least one converter capable of transmitting a basic electrical supply propagating on a basic supply line to the electrical unit as a function of a supply command, the converter being capable of receiving an operational supply via an operational supply line;
- a command module capable of sending the supply command to the converter; and
- at least one interrupt module controlled by the command module, the interrupt module having a state interrupting the operation of the command module when it receives a command to interrupt the command module;
wherein the interrupt module is capable of maintaining its state when the operation of the command module is interrupted.

A malfunction of the electrical unit is intended to mean a malfunction of at least one electrical component of the electrical unit.

By virtue of the invention, when a malfunction of the electrical unit is observed, the command module interrupts the operational supply of the converter so as to force a drop in current on the basic supply line. The command module commands the interruption of its operation so as to eliminate any residual current. Furthermore, this interrupted state is maintained despite the absence of operation of the command module. In this way, the invention makes it possible to avoid making the supply system enter a loop of operation and interruption of the command module.

The electrical supply system according to the invention may furthermore optionally have at least one of the following characteristics:
- the system comprises:
    - at least one other converter capable of transmitting another basic electrical supply propagating on another basic supply line to another electrical unit as a function of a supply command sent by the command module, this other converter being capable of receiving another operational supply via another operational supply line;
    - at least one other interrupt module controlled by the command module, this other interrupt module having a state interrupting the operation of the command module when it receives a command to interrupt the command module, and this other interrupt module being capable of maintaining its state when the operation of the command module is interrupted;
  each interrupt module being associated with a converter, each interrupt module being passed through by the operational supply line of the converter with which it is associated;
- the operational supply line of the or each converter is connected to the basic supply line of this converter upstream of this converter and passes through the associated interrupt module to reach the command module. The command module is thus supplied by the operational supply line, the latter transporting an operational supply coming from the basic supply;
- in the absence of a command to interrupt the command module, when the command module is in operation, the interrupt module or modules have a state enabling operation of the command module;
- the interrupt module or modules comprise a first and a second input, the interrupt module or modules having:

a state enabling operation of the command module only when an enabling command is received on the first input;

a state interrupting the operation of the command module only when an interrupt command is received on the second input;

the operational supply line of the or each converter enters the associated interrupt module through the first input and leaves this interrupt module through an output of this interrupt module;

the command module comprises a command unit and an operational supply unit, the electrical supply unit being connected to the converter or converters via the operational supply line of this or these converters so as to transmit the operational supply to this or these converters. The supply unit thus makes it possible to convert the operational supply or supplies coming from the basic supply or supplies and flowing on the operational supply line or lines so as to adapt it or them for the operation of the converter or converters;

each operational supply line enters the command module through a common input of the supply unit and leave through a specific output of the supply unit in the direction of the converter which it supplies;

the electrical supply unit is controlled by the command unit so that, when the command unit sends the supply command to the converter or one of the converters, the supply unit transmits the operational supply to this converter;

the command unit is capable of diagnosing a malfunction of the electrical unit or units;

when the command unit diagnoses a malfunction of an electrical unit, the command unit is arranged in order to control the supply unit so as to interrupt the operational supply of the converter transmitting the basic supply to this electrical unit;

the command unit is connected to the second input of the interrupt module so that, when the command unit diagnoses a malfunction of an electrical unit, the command unit transmits the interrupt command to the interrupt module associated with the converter transmitting the basic supply to this electrical unit;

the interrupt module or modules comprise at least one controllable switch mounted on the operational supply line on which this interrupt module is mounted, this switch having:

a closed state enabling passage of the operational supply on the operational supply line only when an enabling command is received on the first input;

an open state preventing passage of the operational supply on the operational supply line only when an interrupt command is received on the second input;

the controllable switch comprises a first transistor;

the first transistor is a P-channel insulated gate field-effect transistor, the source of this transistor being connected to the first input of the interrupt module and the drain being connected to the output of the interrupt module;

the first transistor is a bipolar transistor;

the controllable switch comprises a second transistor, this second transistor being an N-channel insulated gate field-effect transistor, the source of this second transistor being connected to the ground, the drain of this second transistor being connected via a first voltage divider bridge to the first input of the interrupt module and to the gate of the first transistor;

the gate of the second transistor is connected to the first input of the interrupt module via a second voltage divider bridge;

the interrupt module or modules comprise a command means capable of controlling the controllable switch as a function of the interrupt command or the enabling command;

the command means is connected to the first and second inputs of the interrupt module;

the command means comprises a thyristor;

the anode of the thyristor is connected to the first input of the interrupt module, in particular via the second voltage divider bridge, in that the cathode of the thyristor is connected to the ground, and in that the gate of the thyristor is connected to the second input of the interrupt module;

the command means comprises a means of protection against electronic perturbations occurring on the second input of the interrupt module;

the protection means is a capacitor connected to the second input of the interrupt module.

The invention also relates to a lighting system for a motor vehicle, comprising:

at least one electrical unit; and an electrical supply system for the electrical unit according to the invention.

The lighting system according to the invention may furthermore optionally have at least one of the following characteristics:

the lighting system comprises at least one other electrical unit supplied by the electrical supply system;

each electrical unit is electrically supplied via the basic supply line of the electrical system which is dedicated to it;

the electrical unit or units are lighting units, in particular comprising at least one light-emitting diode;

the lighting system comprises at least one central diagnostic tool capable of detecting a malfunction of the electrical unit or units;

the central diagnostic tool receives each basic supply line;

the electrical connection system is connected to an electrical battery of the vehicle via the central diagnostic tool, this battery delivering the basic electrical supply.

Other characteristics, details and advantages of the invention will become clearer on reading the description given below by way of indication with reference to the drawings, in which:

BRIEF DESCRIPTION OF THE ACCOMPANYING DRAWINGS

Figure 1:
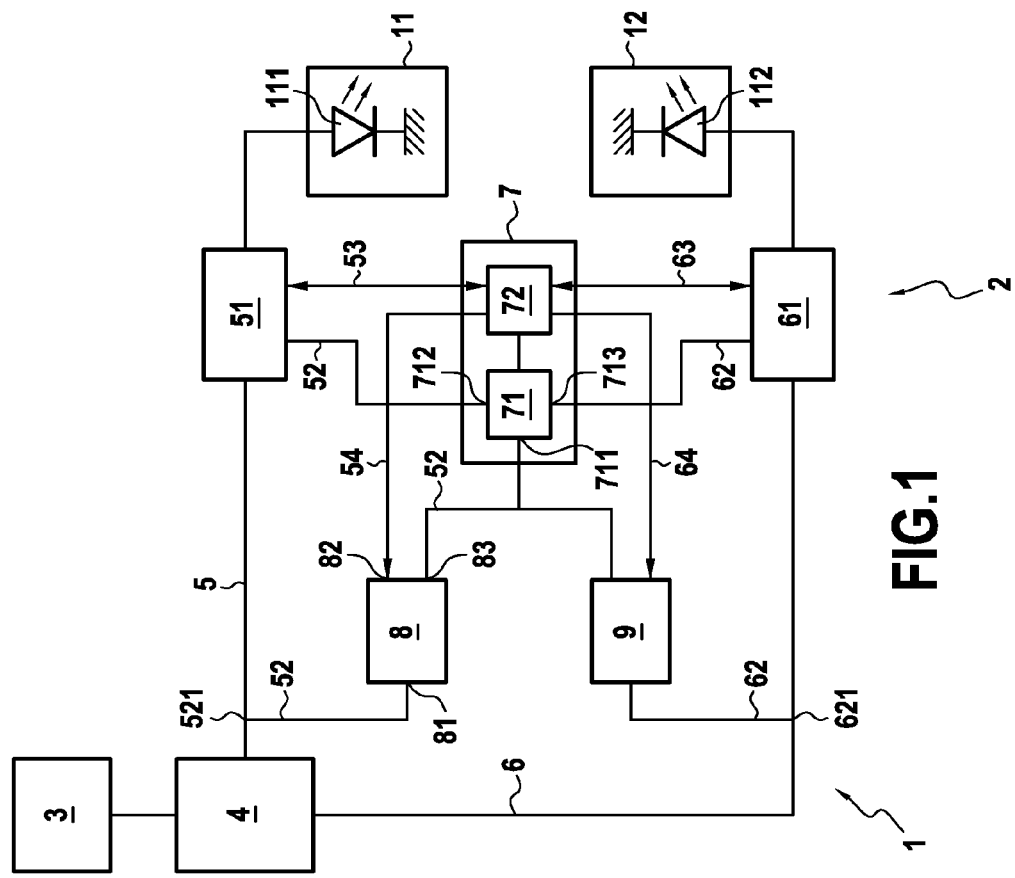

FIG. 1 is a schematic view of a lighting system according to an embodiment of the invention; and FIG. 2 is a schematic view of the interrupt module of the lighting system of FIG. 1.

DETAILED DESCRIPTION OF THE PREFERRED EMBODIMENTS

It should be noted that the figures explain the invention in detail for implementation of the invention, and said figures may of course be used to define the invention more accurately where appropriate.

FIG. 1 illustrates a lighting system 1 for a motor vehicle according to a first embodiment of the invention.

The lighting system 1 comprises at least two electrical units 11 and 12 and an electrical supply system 2 for these electrical units 11 and 12.

The electrical units 11 and 12 are lighting units 11 and 12, each comprising at least one light-emitting diode 111 and 112.

The lighting or electrical units 11 and 12 are arranged in order to carry out at least one function of illuminating the road, signaling or illuminating the passenger compartment.

The electrical supply system 2 is connected to a battery 3 of the vehicle via a central diagnostic tool 4 in order to transmit a basic electrical supply generated by the battery 3 to the lighting or electrical units 11 and 12.

Each lighting or electrical unit 11 and 12 is electrically supplied via a basic supply line 5 and 6 of the electrical supply system 2 which is dedicated to it.

Each basic supply line 5 and 6 is connected to a separate input of the central diagnostic tool 4.

The central diagnostic tool 4 is capable of detecting a malfunction of one of the lighting or electrical units 11 and 12, or even of both, for example by detecting a drop in current on one of the basic supply lines 5 and 6. When a malfunction of a lighting or electrical unit 11 or 12 is detected, the central diagnostic tool 4 is capable of interrupting the basic electrical supply flowing on the basic supply line 5 or 6 of this unit.

The electrical supply system 2 comprises two converters 51 and 61, for example of the flyback or SEPIC type, each being connected to one of the basic supply lines 5 and 6.

The two converters 51 and 61 are each also connected to an operational supply line 52 and 62 and to a control line 53 and 63.

Each operational supply line 52 and 62 of a converter 51 or 61 is connected by a node 521 and 621 to the basic supply line 5 and 6 of this converter 51 or 61, upstream of this converter 51 and 61. The operational supply lines 52 and 62 therefore each transport an operational supply coming from the basic supply.

Each converter 51 and 61 is capable of converting and transmitting the basic electrical supply which it receives to the lighting or electrical units 11 and 12 when these converters 51 and 61 are supplied with the operational supply and when they receive a supply command via the control line 53 and 63.

For example, each converter 51 and 61 may comprise:
a power circuit comprising a switch controlled by means of a signal of the PWM type, the power circuit being arranged in order to convert the basic electrical supply into a supply adapted to the operation of the associated lighting or electrical unit 11 or 12, and
a circuit for control and slaving of this adapted supply.

In the case of the converter 51, the power circuit may be a circuit of the flyback type connected at its input to the basic supply line 5 and at its output to the lighting or electrical unit 11. The control and slaving circuit is then connected both to the control line 53 and to the operational supply line 52. The control and slaving circuit is thus arranged in order to control the duty cycle of the PWM signal controlling the switch of the power circuit as a function of the supply command and in order to slave the output value of the adapted supply with the aid of the operational supply.

The electrical supply system 2 comprises a command module 7 capable of sending the supply commands and the operational supply to each converter 51 and The command module 7 is supplied by the operational supply lines 52 and 62.

The command module 7 comprises an operational supply unit 71 and a command unit 72.

Each operational supply line 52 and 62 enters the command module 7 through a common input 711 of the operational supply unit 71 and leaves through a specific output 712 and 713 of the operational supply unit 71 in the direction of each converter 51 and 61.

The control lines 53 and 63 leave the command unit 72 in the direction of each converter 51 and 61.

The operational supply unit 71 is controlled by the command unit 72 so that, when the command unit 72 sends the supply command to the converter 51 or 61, the operational supply unit 71 transmits the operational supply to this converter 51 or 61.

The command unit 72 is capable of diagnosing a malfunction of one or both of the lighting or electrical units 11 and 12.

When the command unit 72 diagnoses a malfunction of a lighting or electrical unit 11 or 12, the command unit 72 is arranged in order to control the operational supply unit 71 so as to interrupt the operational supply of the converter 51 or 61 transmitting the basic supply to this lighting or electrical unit 11 or 12. In this way, the command module 7 causes a drop in current on the basic supply line 5 of the malfunctioning lighting or electrical unit 11 or 12 so as to warn the central diagnostic tool 4 of this malfunction.

The electrical supply system 2 also comprises two interrupt modules 8 and 9, each interrupt module 8 and 9 being associated with a converter 51 and 61, each interrupt module 8 and 9 being passed through by the operational supply line 52 and 62 of the converter 51 or 61 with which it is associated.

Each interrupt module 8 and 9 is controlled by the command module 7 via a control line 54 and 64 so as to have a state interrupting the operation of the command module 7 when it receives a command on this control line 54 and 64 to interrupt the command module 7.

When the command unit 72 diagnoses a malfunction of a lighting or electrical unit 11 or 12, the command unit 72 transmits the interrupt command to the associated interrupt module 8 or 9 via the control line 54 or 64.

In the absence of a command to interrupt the command unit 72, when the command module 7 is in operation, the interrupt modules 8 and 9 have a state enabling operation of the command module 7.

Furthermore, each interrupt module 8 and 9 is capable of maintaining its state when the operation of the command module 7 is interrupted.

For convenience, only the structure of the interrupt module 8 will be explained below, the structure of the interrupt module 9 being identical to that of the interrupt module 8.

The interrupt module 8 comprises a first input 81 and a second input 82, the interrupt module 8 having:
a state enabling operation of the command module 7 only when an enabling command is received on the first input 81;
a state interrupting the operation of the command module 7 only when an interrupt command is received on the second input 82.

The operational supply line 52 of the converter 51 enters the interrupt module 8 through the first input 81 and leaves this interrupt module 8 through an output 83 of this interrupt module 8.

The control line 54 enters the interrupt module 8 through the second input 82.

FIG. 2 illustrates the structure of the interrupt module 8 in more detail.

The interrupt module 8 comprises at least one controllable switch 84 mounted on the operational supply line 52.

This at least one controllable switch 84 has:
- a closed state enabling passage of the operational supply on the operational supply line 52 only when an enabling command is received on the first input 81;
- an open state preventing passage of the operational supply on the operational supply line 52 only when an interrupt command is received on the second input 82.

The at least one controllable switch 84 comprises a first transistor 85, this first transistor 85 being a P-channel insulated gate field-effect transistor.

The source S1 of this first transistor 85 is connected to the first input 81 of the interrupt module 8, the drain D1 is connected to the output 83 of the interrupt module 8, and the gate G1 is connected to the first input 81 via a resistor R1.

The at least one controllable switch 84 comprises a second transistor 86, this second transistor 86 being an N-channel insulated gate field-effect transistor.

The source S2 of this second transistor 86 is connected to the ground.

The drain D2 of this second transistor 86 being connected via a second resistor R2 to the gate of the first transistor 85.

The pair of resistors R1 and R2 forms a first voltage divider 87.

The gate G2 of the second transistor 86 is connected to the first input 81 of the interrupt module 8 via a third resistor R3. The at least one controllable switch 84 comprises a fourth resistor R4 connected on the one hand to the gate G2 of the second transistor 86 and on the other hand to the ground.

The pair of resistors R3 and R4 forms a second voltage divider bridge 88.

The interrupt module 8 comprises a command means 89 capable of commanding the at least one controllable switch 84 as a function of the interrupt command or the enabling command.

The command means 89 is connected on the one hand to the second input 82 of the interrupt module 8 and on the other hand to the first input 81 of the interrupt module 8.

The command means 89 comprises a thyristor 891.

The anode A of the thyristor 891 is connected to the gate G2 of the second transistor 86, and therefore to the first input 81 of the interrupt module 8, via the resistor R3.

The cathode K of the thyristor 891 is connected to the ground.

The gate G of the thyristor 891 is connected to the second input 82 of the interrupt module 8.

In this way, when the enabling command is received on the input 81 of the interrupt module 8, or alternatively when the operational supply is flowing on the operational supply line 54, the thyristor 891 is in an "open" state, which keeps the first transistor 85 in a closed state so as to enable passage of the operational supply in the direction of the output 83 of the interrupt module 8.

Conversely, when the interrupt command is received on the input 82 of the interrupt module 8, the thyristor 891 enters an "on" state, which opens the first transistor 85 so as to prevent passage of the operational supply in the direction of the output 83 of the interrupt module 8. Furthermore, once the operation of the command module 7 is interrupted, it can be seen that the thyristor 891 maintains an "on" state despite this interruption. Only re-establishment of the operational supply on the operational supply line 54 makes it possible to open the thyristor 891 so as again to enable passage of the operational supply in the direction of the output 83.

The command means 89 comprises a means 892 for protection against electronic perturbations occurring on the second input 82 of the interrupt module 8.

The protection means 892 is a capacitor connected to the second input 82 of the interrupt module 8.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. An electrical supply system for at least one electrical unit of a vehicle, in particular for a lighting unit of a vehicle, said electrical supply system comprising:
   - at least one converter or converters capable of transmitting a basic electrical supply propagating on a basic supply line to said at least one electrical unit as a function of a supply command, said at least one converter or converters being capable of receiving an operational supply via an operational supply line;
   - a command module capable of sending said supply command to said at least one converter or converters; and
   - at least one interrupt module or modules controlled by said command module, said at least one interrupt module or modules having a state interrupting the operation of said command module when it receives a command to interrupt said command module;
   - wherein said at least one interrupt module or modules is capable of maintaining its state when the operation of said command module is interrupted;
   - wherein said electrical supply system comprises:
   - at least one other converter capable of transmitting another basic electrical supply propagating on another basic supply line to another electrical unit as a function of a supply command sent by said command module, said at least one other converter being capable of receiving another operational supply via another operational supply line;
   - at least one other interrupt module or modules controlled by said command module, said at least one other interrupt module or modules having a state interrupting the operation of said command module when it receives a command to interrupt said command module, and said at least one other interrupt module or modules being capable of maintaining its state when the operation of said command module is interrupted;
   - each interrupt module being associated with a converter, each interrupt module being passed through by the operational supply line of the converter with which it is associated.

2. The electrical supply system as claimed in claim 1, wherein in the absence of a command to interrupt said command module, when said command module is in operation, said at least one interrupt module or modules have a state enabling operation of said command module.

3. The electrical supply system as claimed in claim 1, wherein said at least one interrupt module or modules comprise a first input and a second input, said at least one interrupt module or modules having:
   - a state enabling operation of said command module only when an enabling command is received on said first input;
   - a state interrupting the operation of said command module only when an interrupt command is received on said second input.

4. The electrical supply system as claimed in claim 1, wherein said command module comprises a command unit and an operational supply unit, said operational supply unit being connected to said at least one converter or converters via said operational supply line of said at least one converter or converters so as to transmit the operational supply to said at least one converter or converters.

5. The electrical supply system as claimed in claim 4, wherein said operational supply unit is controlled by said command unit so that, when said command unit sends said supply command to said at least one converter or converters, the, said operational supply unit transmits the operational supply to said at least one converter or converters.

6. The electrical supply system as claimed in claim 4, wherein said command unit is capable of diagnosing a malfunction of said at least one electrical unit or units.

7. The electrical supply system as claimed in claim 6, wherein when said command unit diagnoses a malfunction of said at least one electrical unit or units, said command unit is arranged in order to control said operational supply unit so as to interrupt the operational supply of said at least one converter or converters transmitting the basic supply to said at least one electrical unit.

8. The electrical supply system as claimed in claim 3, wherein said command unit is connected to said second input of said at least one interrupt module or modules so that, when said command unit diagnoses a malfunction of said at least one electrical unit, said command unit transmits said interrupt command to said at least one interrupt module or modules associated with said at least one converter or converters transmitting the basic supply to said at least one electrical unit.

9. The electrical supply system as claimed in claim 5, wherein said command unit is capable of diagnosing a malfunction of said at least one electrical unit or units.

10. An electrical supply system for at least one electrical unit of a vehicle, in particular for a lighting unit of a vehicle, said electrical supply system comprising:
    at least one converter or converters capable of transmitting a basic electrical supply propagating on a basic supply line to said at least one electrical unit as a function of a supply command, said at least one converter or converters being capable of receiving an operational supply via an operational supply line;
    a command module capable of sending said supply command to said at least one converter or converters; and
    at least one interrupt module or modules controlled by said command module, said at least one interrupt module or modules having a state interrupting the operation of said command module when it receives a command to interrupt said command module;
    wherein said at least one interrupt module or modules is capable of maintaining its state when the operation of said command module is interrupted;
    wherein said at least one interrupt module or modules comprise a first input and a second input, said at least one interrupt module or modules having:
    a state enabling operation of said command module only when an enabling command is received on said first input;
    a state interrupting the operation of said command module only when an interrupt command is received on said second input;
    wherein said at least one interrupt module or modules comprise at least one controllable switch mounted on said operational supply line on which said at least one interrupt module or modules is mounted, said at least one controllable switch having:
    a closed state enabling passage of the operational supply on said operational supply line only when an enabling command is received on said first input;
    an open state preventing passage of the operational supply on said operational supply line only when an interrupt command is received on said second input.

11. The electrical supply system as claimed in claim 10, wherein said at least one interrupt module or modules comprise a command means capable of controlling said at least one controllable switch as a function of the interrupt command or the enabling command.

12. The electrical supply system as claimed in claim 11, wherein said command means is connected to said first input and said second input of said at least one interrupt module or modules.

13. The electrical supply system as claimed in claim 12, wherein said command means comprises a thyristor.

14. The electrical supply system as claimed in claim 13, wherein an anode (A) of said thyristor is connected to said first input of said at least one interrupt module or modules, in that a cathode (K) of said thyristor is connected to the ground, and in that a gate (G) of said thyristor is connected to said second input of said at least one interrupt module or modules.

15. A lighting system for a motor vehicle, comprising:
    at least one electrical unit; and
    an electrical supply system for said at least one electrical unit of said motor vehicle, in particular for a lighting unit of a vehicle, said electrical supply system comprising:
    at least one converter or converters capable of transmitting a basic electrical supply propagating on a basic supply line to said at least one electrical unit as a function of a supply command, said at least one converter or converters being capable of receiving an operational supply via an operational supply line;
    a command module capable of sending said supply command to said at least one converter or converters; and
    at least one interrupt module or modules controlled by said command module, said at least one interrupt module or modules having a state interrupting the operation of said command module when it receives a command to interrupt said command module;
    wherein said at least one interrupt module or modules is capable of maintaining its state when the operation of said command module is interrupted;
    wherein said lighting system comprises at least one other electrical unit supplied by said electrical supply system.

16. The lighting system as claimed in claim 15, wherein each of said at least one other electrical unit is electrically supplied via said basic supply line of said electrical supply system which is dedicated to it.

17. The lighting system as claimed in claim 15, wherein said at least one other electrical unit or units are lighting units, in particular comprising at least one light-emitting diode.

18. The lighting system as claimed in claim 15, wherein said lighting system comprises at least one central diagnostic tool capable of detecting a malfunction of said at least one other electrical unit or units.

* * * * *

UNITED STATES PATENT AND TRADEMARK OFFICE
CERTIFICATE OF CORRECTION

PATENT NO.        : 9,505,347 B2
APPLICATION NO.   : 14/772556
DATED             : November 29, 2016
INVENTOR(S)       : Marc Godiveau It is certified that error appears in the above-identified patent and that said Letters Patent is hereby corrected as shown below:

In the Specification

Column 5, Line 65, insert -- 61. -- after "51 and".

Signed and Sealed this
Thirty-first Day of January, 2017

Michelle K. Lee
*Director of the United States Patent and Trademark Office*